MAGNETIC TAPE RECORDING EQUIPMENT

Filed Dec. 12, 1952 10 Sheets-Sheet 1

INVENTOR
Bruce Roberts
BY
[signature]
ATTORNEYS

INVENTOR
Bruce Roberts
BY
Sughrue, Rothwell & Leckman
ATTORNEYS

Feb. 17, 1959 B. ROBERTS 2,873,926

MAGNETIC TAPE RECORDING EQUIPMENT

Filed Dec. 12, 1952 10 Sheets-Sheet 3

INVENTOR
Bruce Roberts

BY
[signature]
ATTORNEYS

INVENTOR
Bruce Roberts
BY
ATTORNEYS

MAGNETIC TAPE RECORDING EQUIPMENT

Filed Dec. 12, 1952

10 Sheets-Sheet 5

INVENTOR
Bruce Roberts
BY
Lyon & Lyon
ATTORNEYS

Feb. 17, 1959 B. ROBERTS 2,873,926

MAGNETIC TAPE RECORDING EQUIPMENT

Filed Dec. 12, 1952 10 Sheets-Sheet 6

INVENTOR
Bruce Roberts
BY
ATTORNEYS

Feb. 17, 1959 B. ROBERTS 2,873,926

MAGNETIC TAPE RECORDING EQUIPMENT

Filed Dec. 12, 1952 10 Sheets-Sheet 7

INVENTOR
Bruce Roberts
BY
Synnestvedt & Lechner
ATTORNEYS

INVENTOR
Bruce Roberts
BY Synnestvedt & Lechner
ATTORNEYS

Feb. 17, 1959 B. ROBERTS 2,873,926

MAGNETIC TAPE RECORDING EQUIPMENT

Filed Dec. 12, 1952 10 Sheets-Sheet 9

INVENTOR
Bruce Roberts
BY
[signature]
ATTORNEYS

MAGNETIC TAPE RECORDING EQUIPMENT

Filed Dec. 12, 1952 10 Sheets-Sheet 10

INVENTOR
Bruce Roberts
BY
Symmes Wood & Lechner
ATTORNEYS 2,873,926

MAGNETIC TAPE RECORDING EQUIPMENT

Bruce Roberts, Oberlin, Ohio, assignor, by mesne assignments, to Armour Research Foundation of Illinois Institute of Technology, Chicago, Ill., a corporation not-for-profit of Illinois Application December 12, 1952, Serial No. 325,609

11 Claims. (Cl. 242—55.12)

This invention relates to apparatus for the production and reproduction of recordings on magnetic tape.

It is well known that intelligence may be recorded upon steel wire or upon paper which has been coated with a magnetizable material, and that by this means recordings of relatively much greater length may be made than are possible within the limitations of phonograph records of reasonable size.

A general object of the present invention is to provide improved apparatus for recording and reproducing intelligence on flexible tape type magnetic records.

Another object of the invention is to provide, in combination, means for reproducing alternatively either disc recordings or magnetic tape recordings.

A further object of the invention is a highly novel means for translating magnetic tape in relation to a magnetic recording or reproducing head.

Another object of the invention is to provide novel means for maintaining the transducer in scanning relationship with the record.

A still further object of the invention is the provision of novel drive means for a magnetic tape translating device.

Yet another object of the invention is an apparatus capable of producing or reproducing on a continuous length of tape magnetic recordings, portions of which are recorded in opposite directions.

In accordance with another object of the invention novel means are provided for repeatedly reversing the direction of translation of a tape and for advancing a transducer across the tape, to provide for the successive scanning of a multiplicity of parallel tracks on the tape.

How the foregoing and other objects are attained will appear more clearly upon consideration of the description hereinbelow and the attached drawings, in which.

The form of my novel tape recording device shown in Figures 1 to 12 will be considered first.

It is contemplated that the device of this invention may be used in conjunction with the radio frequency tuner, audio amplifier, loudspeaker, and cabinet of a conventional radio set, and that the present invention will enjoy the same physical relationship to such set as does a conventional disc record player. It is to be understood, however, that the specific nature of the radio set forms no part of the present invention, and that the invention is not limited to operation in conjunction with such a set, but may be used in connection with a separate amplifier and loudspeaker, as will be clearly understood by those skilled in the art.

Figure 1:
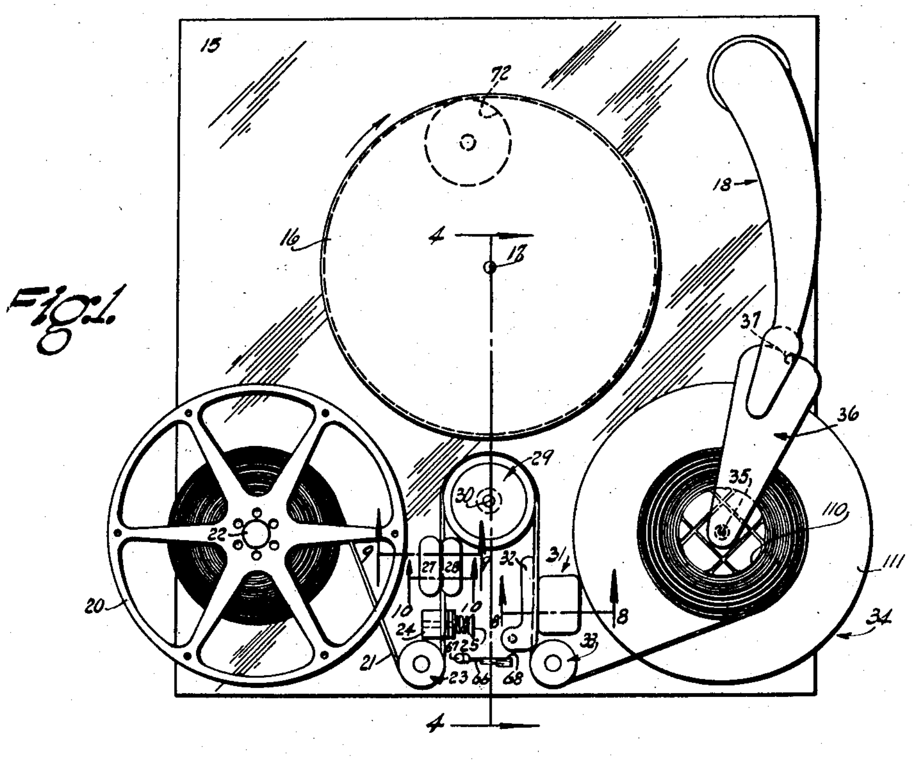
Figure 1 is a plan view of one form of my novel tape recording device.

Turning now to the drawings, it will be seen in Figure 1 that mounted on a top deck 15 is a phonograph turntable 16, having a shaft 17. The turntable is driven through a drive puck 72 (shown in dotted outline), by an electric motor not visible in this view.

Adjacent the turntable, a tape storage reel 20, on which is wound a portion of the tape 21, is mounted for rotation with shaft 22. The tape 21 passes around idler 23, through perforator 24, thence between contact housings 27 and 28 and around tape-driving capstan 29, which is mounted for rotation on shaft 30. The tape then passes between head housing 31 and tape latch 32, around pulley 33 and thence onto reel 34, which is mounted for rotation on shaft indicated in dotted outline at 35. Reel 20 may be a conventional motion picture film reel. The invention contemplates that tapes may be stored on such reels and that reels containing tape will be inserted as a unit into the machine.

Reel 34, which is a permanent part of the apparatus, comprises a central core 110 and a bottom tape guide of circular form 111, secured to the core for rotation therewith. Reel 34 is also provided with a non-rotative tape guide 36 swingably mounted on base plate 15 as indicated at 37. Although the tape has been described as feeding from reel 20 to reel 34, it should be understood that the tape drive mechanism is reversible, as will appear hereinbelow.

Figure 4:
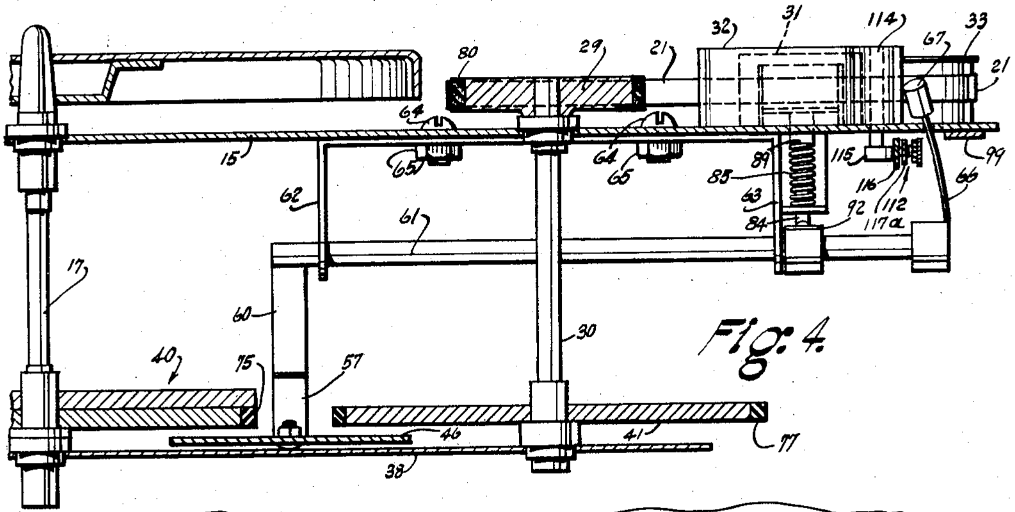
Figure 4 is also a vertical sectional view on an enlarged scale, taken along the line 4—4 in Figure 1.
Figure 5:
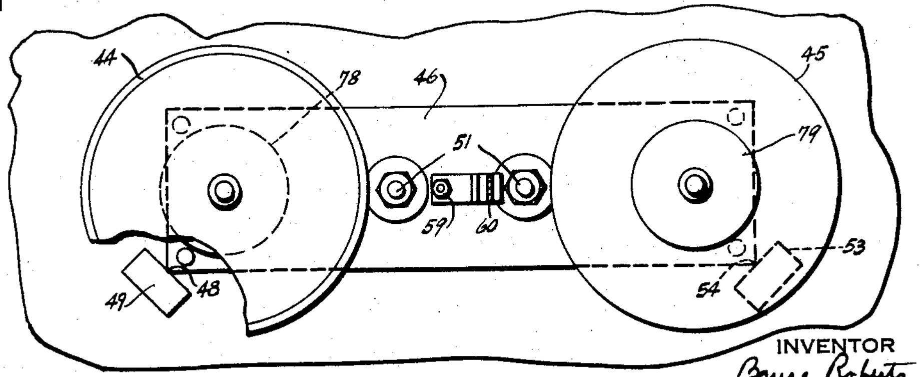
Figure 5 is a fragmentary view, partly in plan and partly broken, of the central portion of Figure 2.

It should be noted that the various portions of the tape-translating mechanism, including the reels and the capstan 29, are mounted below the plane of the top surface of turntable 16, as may be seen in Figure 4. This orientation permits the tape-translating mechanism to be mounted comparatively close to the turntable 16 without regard to the size of the disc records which may be employed in conjunction therewith. For example, it is contemplated that a standard 12" disc record will overlie at least a part of the tape-translating mechanism.

In connection with the tape-translating mechanism, it should further be noted that the tape path is defined exclusively by the idler pulleys 23 and 33 and capstan 29, the runs between the two idlers and the capstan being substantially parallel, and the tape being in contact with the capstan throughout approximately 180° of arc. By this arrangement, two advantages are achieved. First, the tape runs between the pulleys and the capstan are unaffected by the extent of winding or unwinding of tape from the reels 20 and 34, and, second, the comparatively large area of contact between the tape and the capstan insures extended frictional engagement, and makes for highly uniform translation of the tape. As will be discussed more fully hereinbelow, the drive to the capstan and the drive to whichever reel is winding at a given moment is such that more slippage is incorporated in the drive to the reel, whereby the speed of the capstan establishes the speed of the tape, and the reel speed is permitted to adjust itself in proportion to the amount of tape laid up on the reel, and yet maintain tension on the tape in its run from the capstan to the reel in question.

According to the first form of the invention, those parts of the mechanism which operate in conjunction with the moving tape are disposed along one or the other of the straight runs of the tape between the idler pulleys and the capstan. For example, the recording head 81 is mounted in housing 31 in juxtaposition to the run of tape between idler pulley 33 and capstan 29. On the opposite side of the same run of the tape is tape latch 32, which may be seen in plan in Figure 1 and in section in Figure 8, which serves the function of maintaining the tape against the pole pieces diagrammatically indicated at 90 and 91 of a suitable recording head 81. This latch also doubles as a manual power switch, as will appear more fully hereinbelow. Disposed along the run of the tape between idler pulley 23 and capstan 29 is to be seen a perforator 24, having a plunger 25. This device functions in the manner of a simple punch, being arranged to produce a hole in the tape when the plunger 25 is depressed. Along the same run of tape is a pair of switches mounted in housings 27 and 28. The first of these may be seen in section in Figure 9. This is the automatic shutoff switch for the driving motor. Immediately adjacent thereto is the automatic reversing switch which is arranged to respond to the presence of a perforation of the sort produced upon the operation of perforator 24 (see Figure 10).

Figure 2:
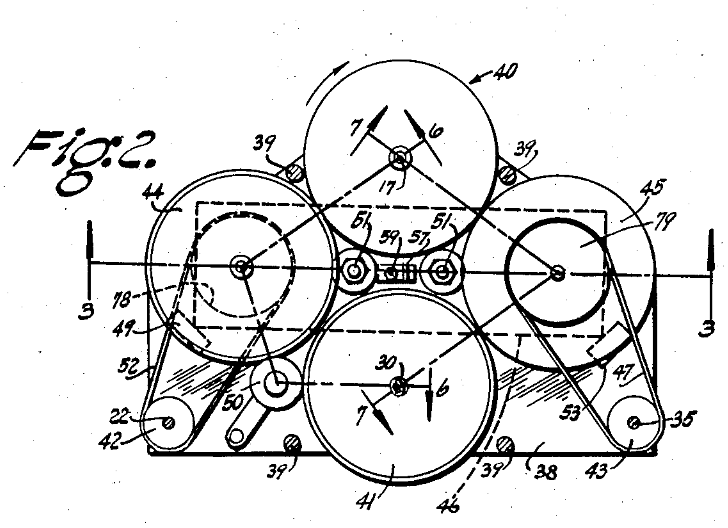
Figure 2 is a view of the device shown in Figure 1 with the upper deck removed, taken in the plane represented by line 2—2 in Figure 3, and showing the drive means for my novel tape-translating system.

Turning now to the drive mechanism, reference should first be had to Figure 2, which represents the parts lying below top deck 15. These parts are mounted on lower deck 38 which is secured to top deck 15 by spacers 39. It should first be pointed out that drive disc 40 is mounted for rotation with turntable shaft 17, that driven disc 41 is mounted for rotation with capstan shaft 30, and that pulleys 42 and 43 are mounted on reel shafts 22 and 35 respectively. When the turntable 16 is driven clockwise, therefore, disc 40 will also rotate clockwise. Intermediate discs 44 and 45 are rotatably mounted on a plate 46 which is loosely mounted on lower deck 38 by bolts 51 passing through oversize holes 38*a* in deck 38, and may be moved in a sense substantially coincident with line 3—3 in Figure 2, bringing the discs alternately into peripheral engagement with disc 40. Secured to intermediate discs 44 and 45, respectively, are reel driving pulleys 78 and 79. Thus, when the plate 46 is moved to the left, disc 45 will come into peripheral contact with disc 40 and also with disc 41, as a result of which disc 41 will be driven in the same direction as disc 40, that is to say, clockwise. At the same time, pulley 43 will be driven counterclockwise by belt 47 and as a result tape reel 35 will also rotate counterclockwise and take up the slack in the tape between capstan 30 and reel 34.

It should be noted that belts 47 and 52 are elastic in order to permit movement of intermediate discs 44 and 45. The elasticity of these belts results in the imposition of torque moments on the ends of plate 46, which tend to constrain the plate in the direction of driven disc 41. The tension of these belts, therefore, tends to maintain the intermediate discs in contact with the driven member or idler disc when one or the other of the intermediate discs is in driving position, but it is necessary to counteract the torque moment on the intermediate disc which is out of engagement at a given moment. How this is accomplished will be seen upon reference to Figure 5. When plate 46 is moved to the left, the lower left-hand corner 48 abuts upon guide plate 49 and is deflected away from idler 50 (Figure 2) which is spring-held against disc 41. As a result, disc 44 is dissociated from disc 40 as well as from disc 41.

Now, if the plate 46 be moved to the opposite extreme of its motion, that is, to the right, disc 45 will be moved out of engagement with disc 40 and by the intermediation of guide plate 53, corner 54 of plate 46 will be deflected upward and disc 45 will move out of engagement with driven disc 41. Simultaneously, disc 44 will come into peripheral engagement with disc 40 and idler 50, with the result that disc 41 will now be driven through the train 40, 44 and 50, and hence will rotate in a counterclockwise direction, that is, opposite to disc 40. As a result, capstan 29 will also rotate in a counter-clockwise direction, pulling tape from reel 34 which is now a part of a free running system including the reel 34, pulley 35 and intermediate disc 45. Tape reel 20 is now driven by intermediate disc 44, which is rotating counter-clockwise, through belt 52 and pulley 42, and thereby is enabled to take up the slack in the tape created by capstan 29.

It should be noted that at the relatively slow speeds at which the tape translating mechanism operates, the frictional losses in the free running system comprising the unwinding reel, its pulley, and the intermediate disc beltably connected therewith, are sufficient to prevent overspeeding of the unwinding reel and hence obviate the necessity for a separate brake to retard the rotation of a reel during the unwinding phase.

Figure 3:
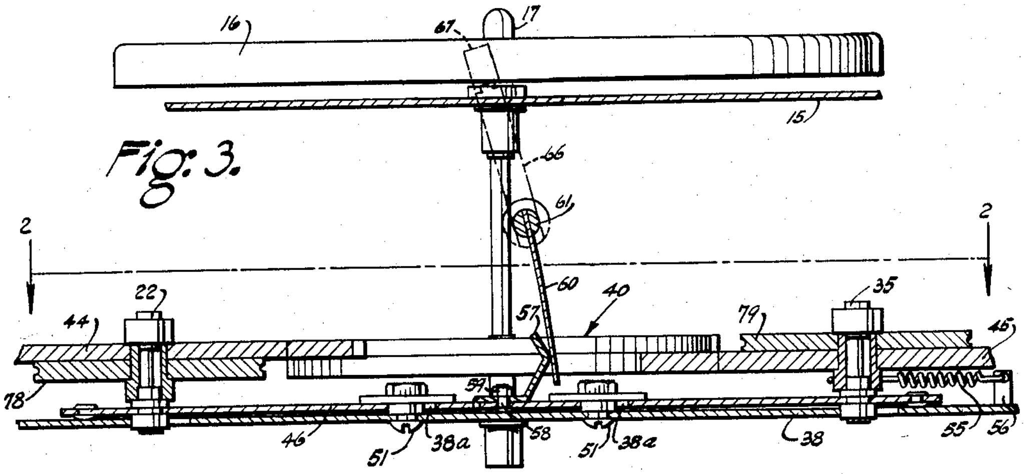
Figure 3 is a vertical sectional view on an enlarged scale, taken along the line 3—3 in Figure 2.
Figures 9, 10, 11:
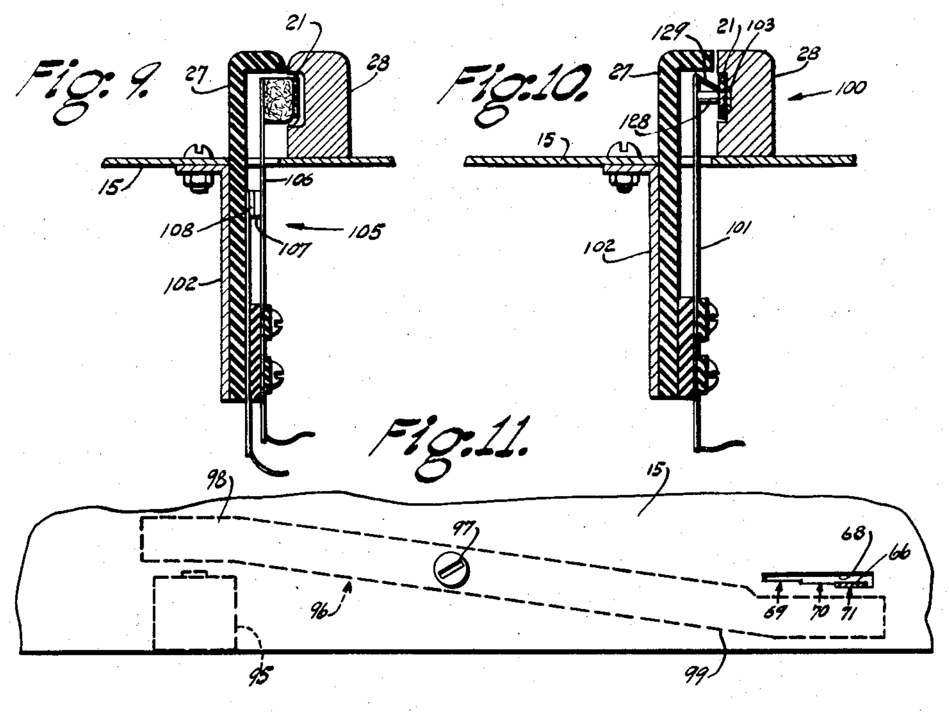
Figure 9 is a vertical sectional view taken along the line 9—9 in Figure 1, and shows the automatic power switch.
Figure 10 is a vertical sectional view taken along the plane indicated by the line 10—10 of Figure 1, and shows the automatic reversing switch.
Figure 11 is a fragmentary plan view of a portion of the automatic reversing mechanism of the form of tape device shown in Figure 1.

Turning now to Figure 3, it will be seen that plate 46, together with intermediate discs 44 and 45, is yieldingly held at the extreme right end of its lateral movement by spring 55, which is secured to bracket 56 mounted on lower deck 38. Intermediate shafts 22 and 35 is a shifting element 57 secured to plate 46 by bolt 58 and nut 59. Operatively associated with element 57 is a crank-arm 60 secured at its upper end to control shaft 61 (see Figure 4). Control shaft 61 is supported by brackets 62 and 63 secured to upper deck 15 by bolts 64 and nuts 65. Shaft 61 is adapted to be rotated through an arc by operating lever 66 having handle 67. It will be seen that rotation of control shaft 61 will cause an angular movement of crank-arm 60, and hence motion of plate 46 against the tension of spring 55. In Figure 11 it will be noted that operating lever 66 penetrates an aperture 68 in top deck 15, the aperture incorporating a rack having three steps—69, 70 and 71. Operating lever 66 is sprung so as to be normally maintained in engagement with one of the steps, which are so spaced that when the lever 66 is in engagement with the center step 70, neither of the intermediate drive discs 44 or 45 is in contact with drive disc 40, with the result that the turntable 16 rotates freely and the tape drive mechanism remains at rest. The other two steps correspond to the two operative positions of the tape-driving mechanism, step 71 corresponding to the position of the drive members in which capstan 29 rotates in a clockwise direction.

Figure 6:
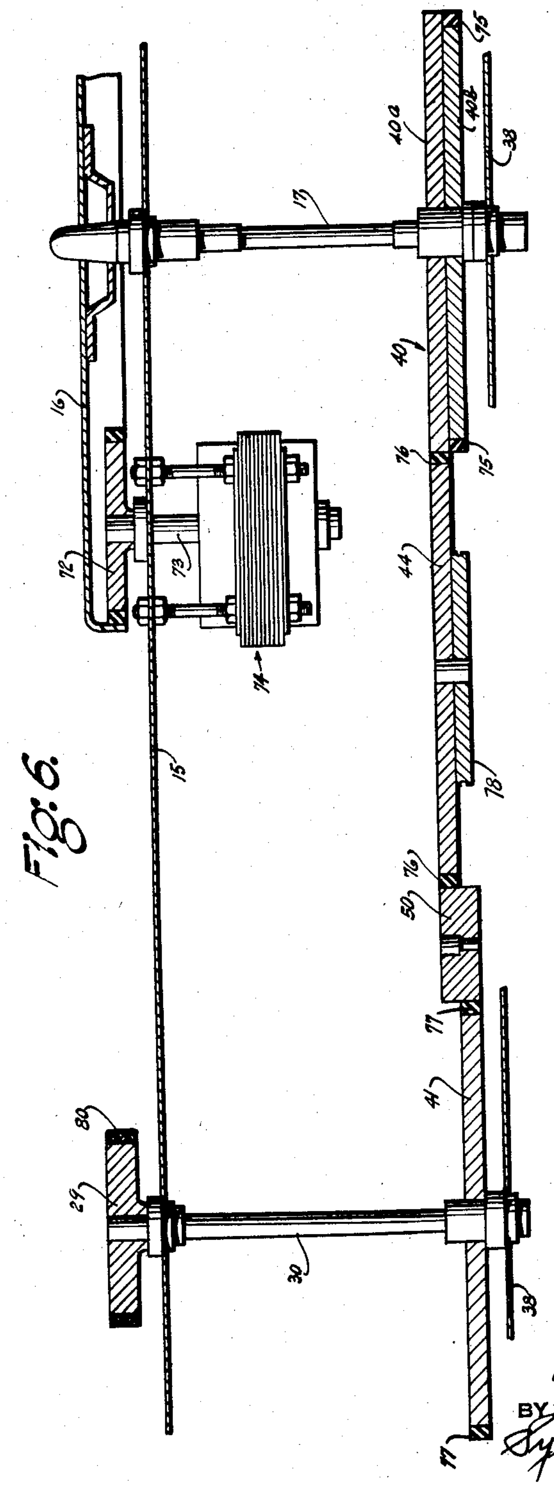
Figure 6 is a broken sectional view taken along the line 6—6 in Figure 2, through the points of tangency of the members comprising the reverse drive train.
Figure 7:
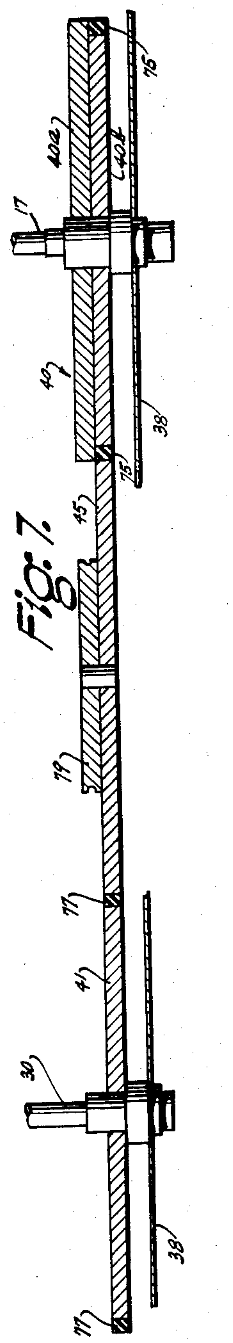
Figure 7 is a similar sectional view taken along the line 7—7 in Figure 2, showing the forward motion drive train.

Figures 6 and 7 represent broken sections taken through the points of contact of the drive train, Figure 6 representing the drive from disc 40 through disc 44 and idler 50, to driven disc 41, and hence depicting the condition of the parts when operating lever 66 is in engagement with step 69. Figure 7, on the other hand, represents the drive from disc 40 through disc 45 to disc 41, and therefore represents the condition when operating lever 66 is in engagement with step 71.

It should be noted that the drive train throughout involves the peripheral engagement of a metal surface against a rubber surface. For example, in Figure 6, rubber rimmed puck 72, mounted on shaft 73 of phonograph motor 74, engages the metal rim of turntable 16. Disc 40 is composite, the upper portion 40*a* being all metal, and the lower portion 40*b* being provided with a friction tire 75. Disc 44 is also provided with a tire 76, arranged to contact upper section 40*a* of disc 40. Pulley 50 is entirely metallic and is driven by tire 76 and drives tire 77 on disc 41.

Turning to Figure 7, it will be seen that pulley 45 is all metal and bears against tire 75 on disc 40. Disc 41, as has been stated above, is provided with a tire 77. Thus, the power train in either position involves rubber against metal contacts throughout.

It will also be noted in Figures 6 and 7 that discs 44 and 45 have mounted concentrically therewith pulleys 78 and 79 respectively, and that the arrangement of the disc 44 and pulley 78 is inverted as compared with disc 45 and pulley 79 in order to maintain the rubber to metal contact throughout each of the drive trains.

Although the absolute size of discs 40, 41, 44 and 45 is not significant in determining the ratio of speeds of the drive and the tape-translating mechanism, this ratio being determined rather by their relative sizes, I have found that irregularities in the dimensions of the drive discs tend to induce irregularities of tape-translating speed with concomitant distortion of the recorded signal. Within reasonable limits, a large disc and a small disc can be manufactured to approximately the same absolute tolerances and, accordingly, I prefer to use relatively large discs, since the same absolute variation in dimensions in a large disc produces a smaller variation in speed than the same absolute variation in dimensions will produce when small discs are employed.

Finally, in conjunction with the driving arrangements, it will be noted that capstan 29 is also provided with a tire of material having a high coefficient of friction as represented at 80.

According to the first form of the invention, the coefficient of friction between pulleys 78 and 79 and belts 47 and 52 is lower than the coefficient of friction between tape 21 and the tire 80 on capstan 29. As a result, the speed of the tape is determined solely by the speed of capstan 29, the ratio of the drive to the tape reel being such that the theoretical winding speed is always greater than the capstan speed. This results in a tensioning of the tape between the capstan and the winding reel, and the differential between the coefficients of friction mentioned above prevents this tension from increasing to the point where damage to the tape might result.

From the above it will be understood, therefore, that I have provided means for propelling the tape from one reel around the capstan, past the recording head, and onto the other reel, and means for reversing the direction of the tape.

Figure 8:
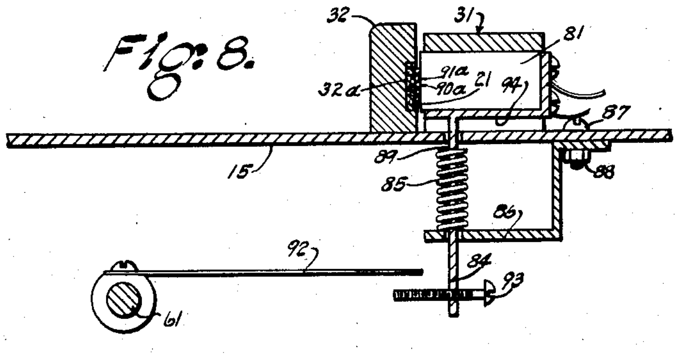
Figure 8 is a vertical sectional view taken in the plane indicated by the line 8—8 in Figure 1 and showing the means for reorienting the recording head in relation to the tape.

Turning now to the means for shifting the recording head, it will be seen in Figure 8 that recording head 81 is mounted in housing 31 for vertical displacement relative to tape 21 by means of head-actuating post 84. The specific construction of recording head 81 is not disclosed, the design of this head being no part of the present invention. It should be understood, however, that the invention contemplates the employment of a magnetic recording head of the type which is capable of functioning both to record and to reproduce intelligence, and that whenever the term "recording head" is used in the specification and claims, it refers to a head capable of performing both of these functions. Head 81 is yieldingly held at its extreme upper position by means of spring 85, which abuts at its lower end against bracket 86 which is secured to top deck 15 by bolt 87 and nut 88, and at its upper end against shoulder 89 on head-actuating post 84 (see Figure 4). Thus, when spring 85 is extended, pole pieces 90*a* and 91*a* scan tape 21 along a path in the upper half of the tape. However, when control shaft 61 is rotated in a clockwise direction by moving handle 67 into engagement with step 71, head crank 92 strikes bolt 93, pulling down post 84 and compressing spring 85 until the bottom surface 94 of head 81 comes in contact with top deck 15, at which time pole pieces 90*a* and 91*a* scan a path in the bottom half of tape 21. Thus, when reversing control 67 is moved manually from step 69 to step 71, reversing the direction of tape drive, head 81 is shifted from a track in the upper half of tape 21 to a track in the lower half of tape 21.

In Figure 11 will be seen, in dotted outline, a solenoid 95 operatively associated with a lever 96 pivoted to top deck 15 at 97. When solenoid 95 is energized, portion 98 of lever 96 is drawn toward the solenoid and portion 99 (see Figure 4) strikes operating lever 66, forcing it out of step 71 and permitting the whole reversing mechanism to be drawn to the opposite position by spring 55.

Solenoid 95 is controlled by switch 100 (see Figure 10), which switch comprises spring leaf 101 supported by bracket 102 from top deck 15 and contact 103 set into metallic support element 28 which is grounded to top deck 15. Spring leaf 101 is provided with a composite contact comprising contact member 128 and guide member 129. When the tape is dropped vertically between housing 27 and housing 28, member 129 deflects the bottom edge of the tape around the end of contact 128. Contact 128 and contact 103 are normally separated by tape 21. Switch 100, therefore, is adapted to energize solenoid 95 whenever a perforation in the tape permits contact 128 to engage contact 103.

Such perforations may be made in tape 21 at will by means of punch 24. The tape is continuously fed through punch 24 and it is only necessary to operate plunger 25 to create a suitable perforation in tape 21.

Switch 105 (see Figure 9) is adapted to be maintained in closed position by the presence of tape 21 between spring 106 and housing 28. It will be noted that housing 28 is recessed opposite spring leaf 106, allowing for a range of movement of leaf 106 considerably greater than the thickness of tape 21, and thus insuring positive operation of the switch. This switch controls the supply of current to motor 74. When the end of the tape 21 passes through switch 105, permitting spring 106 to move contact 107 from engagement with contact 108, the current supply to motor 74 will be interrupted and the entire mechanism will come to rest.

In addition to automatic switch 105, I have provided a manual switch 112 (see Figure 4), which is controlled by movement of tape latch 32. As may be seen in the figure, tape latch 32 is mounted for swing motion with a pin 114, which penetrates top deck 15. Secured to the lower end of the pin is an eccentric 115 which is arranged to drive switch 112 through dielectric element 116. Switch 112 is a leaf switch similar to switch 105, as shown in Figure 9. The profile of cam 115 is such as to close the contacts of switch 112 when tape latch 32 is in position to maintain the tape against the face of recording head 81, and to permit the switch to open when the latch is swung out of engagement with the tape. Spring leaf 117*a* of switch 112 performs the dual function of separating the contacts of the switch and of maintaining the tape latch in either the closed or open position, by virtue of the fact that cam 115 is provided with two low segments separated by a rounded high segment. As shown in Figure 8, tape latch 32 is provided with an insert 32*a* cross hatched to indicate fibre, leather, or packing.

Figure 12:
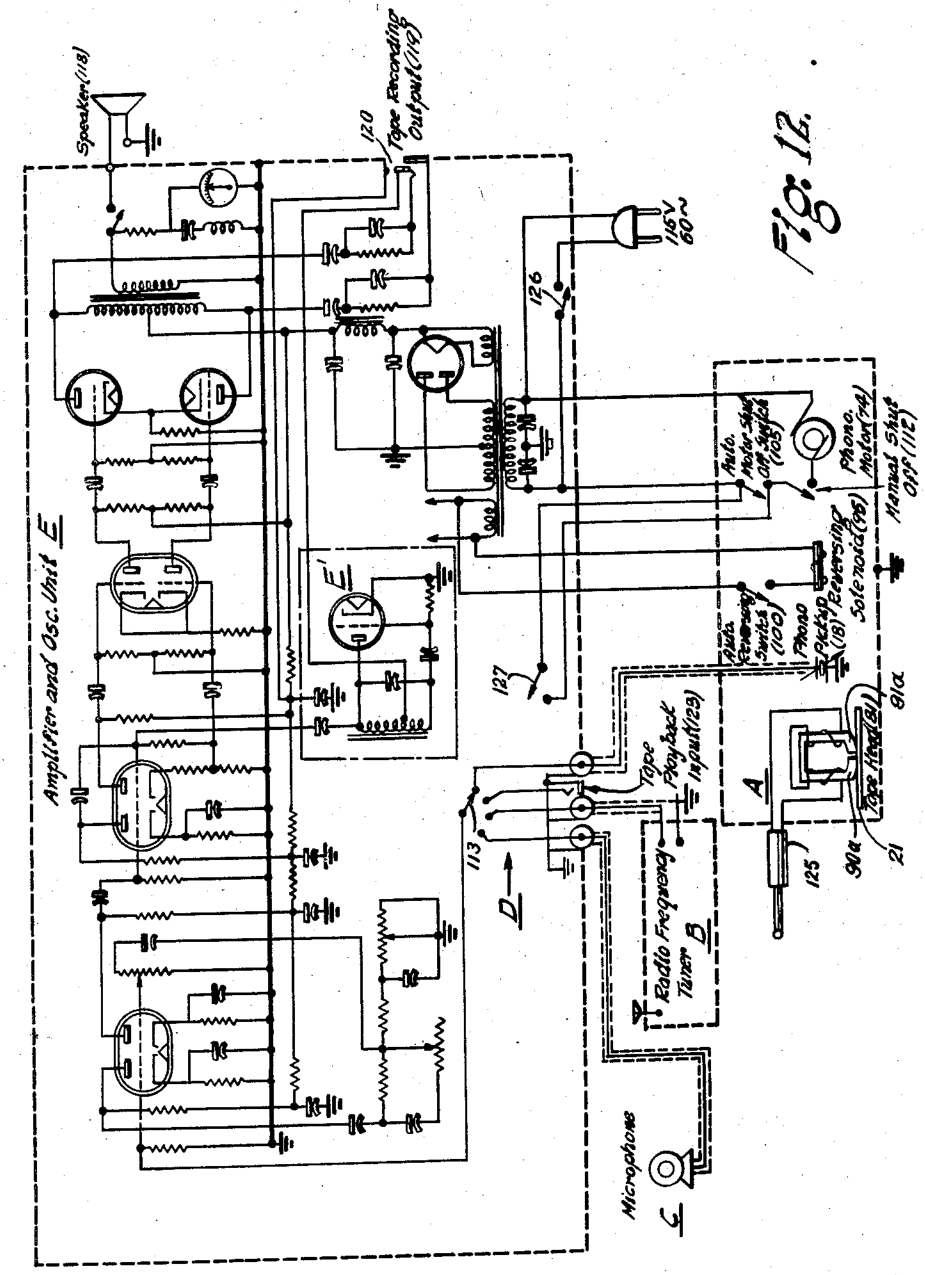
Figure 12 is a diagram showing the electrical connections between the parts of the form of the present invention shown in Figures 1 to 11 and other devices operatively associated therewith.

Figure 12 is a schematic diagram of one arrangement of the elements of the first form of the invention, in which block A represents the mechanism of Figures 1–11; blocks B and C represent a radio frequency tuner and microphone, respectively; and D represents switch means, including a switch 113, for connecting alternatively the outputs of the magnetic recording head, the phonograph pick-up, the tuner, or the microphone to the input of a suitable amplifier such as the one schematically indicated at E. Operatively associated with the amplifier is an oscillator circuit E′ for providing tape recording bias. In addition, the normal output of amplifier E is shown as connected to a loudspeaker 118, and the recording output is connected to a jack 119. This jack includes a switch 120 for controlling oscillator E′, whereby the oscillator is rendered inoperative except when the apparatus is adjusted for recording on magnetic tape.

The adjustment of the apparatus to make a tape recording, for example, from a disc recording will now be described. Main power switch 126 is closed, switch D is set to connect the amplifier input to phonograph pick up 18, plug 125 is inserted in tape record output jack 119, actuating switch 120 and thereby energizing oscillator E′. A phonograph record is placed on turntable 16, and a reel 20 of unrecorded tape is placed on the machine and the tape threaded as described above, around pulley 23, through punch 24, between switch housings 27 and 28, around capstan 29, between head housing 31 and tape latch 32, around pulley 33 and onto reel 34. Manual control handle 67 is thrown to the extreme right into engagement with step 71, phonograph motor switch 127 is opened and the motor energized by tape latch switch 112 (see Figure 12). Pick up 18 is now lowered onto the record. If both sides of a disc recording are to be recorded on tape, when the first side has been recorded, switch 112 is opened, punch button 25 is depressed momentarily to perforate the tape, and operating handle 67 is thrown to the extreme left into engagement with step 69. This simultaneously effects the reversal of the tape drive mechanism and shifts the recording head to the upper track on tape 21. The disc record is inverted, power switch 112 is energized, and recording resumed. When the second side of the disc has been fully recorded, tape 21 will be fully wound on reel 20 and in position to be reproduced.

It should be understood that when making tape recordings from a series of disc recordings or from the radio tuner or microphone, the duration of the completed recording is estimated in advance, and the reversing operations are performed when half of the estimated time has elapsed, in order to insure that the two recording tracks on the tape are of substantially equal length. For example, if a symphony comprising twelve sides on disc records is to be transferred to a tape recording, the mechanism will be reversed after six of the sides have been transferred with the tape mechanism running in one direction. If a radio program of known length, for example, thirty minutes, is to be recorded, the reversing operation will be scheduled to occur at the conclusion of the first fifteen minutes.

To reproduce a tape recording made in accordance with any of the procedures outlined above, plug 125 is removed from tape recording output jack 119 (de-energizing oscillator E′) and inserted in jack 123. Switch D is then actuated to connect jack 123 to the input of amplifier E. Reproduction of the entire recording is automatic, the operation of the equipment being as follows: When the motor is energized, tape feeds from reel 20 through the drive mechanism and recording head onto reel 34, as described above. When the perforation made by perforator 24 passes through switch 100, solenoid 95 is energized, attracting end 98 of lever 96 and forcing operating lever 66 out of engagement with slot 71. Spring 55 now effects the reversal of the drive mechanism and the shifting of recording head 81 to the upper track in the manner described above. The tape is now fed in the reverse direction until the reproduction of the recording has been completed, and the end of the tape passes through switch 105, separating contacts 107 and 108, and breaking the circuit to motor 74, at which time the recorded tape is again fully wound on reel 20 in position to be removed for storage or again reproduced.

As will be readily apparent, phonograph records may be reproduced directly by operating the equipment as above described, except that the output of the amplifier is connected only to the loudspeaker and control handle 67 is placed in the neutral position. In addition, if no tape is in the machine during reproduction of phonograph records, phonograph switch 127 must be closed, short circuiting automatic switch 105 in order to establish the path to phonograph motor 74. Similarly, the output of the tuner and microphone may be reproduced directly by adjusting switch D to the appropriate position.

The second form of my invention, illustrated in Figures 13 to 18, will be considered next.

Figures 13, 14:
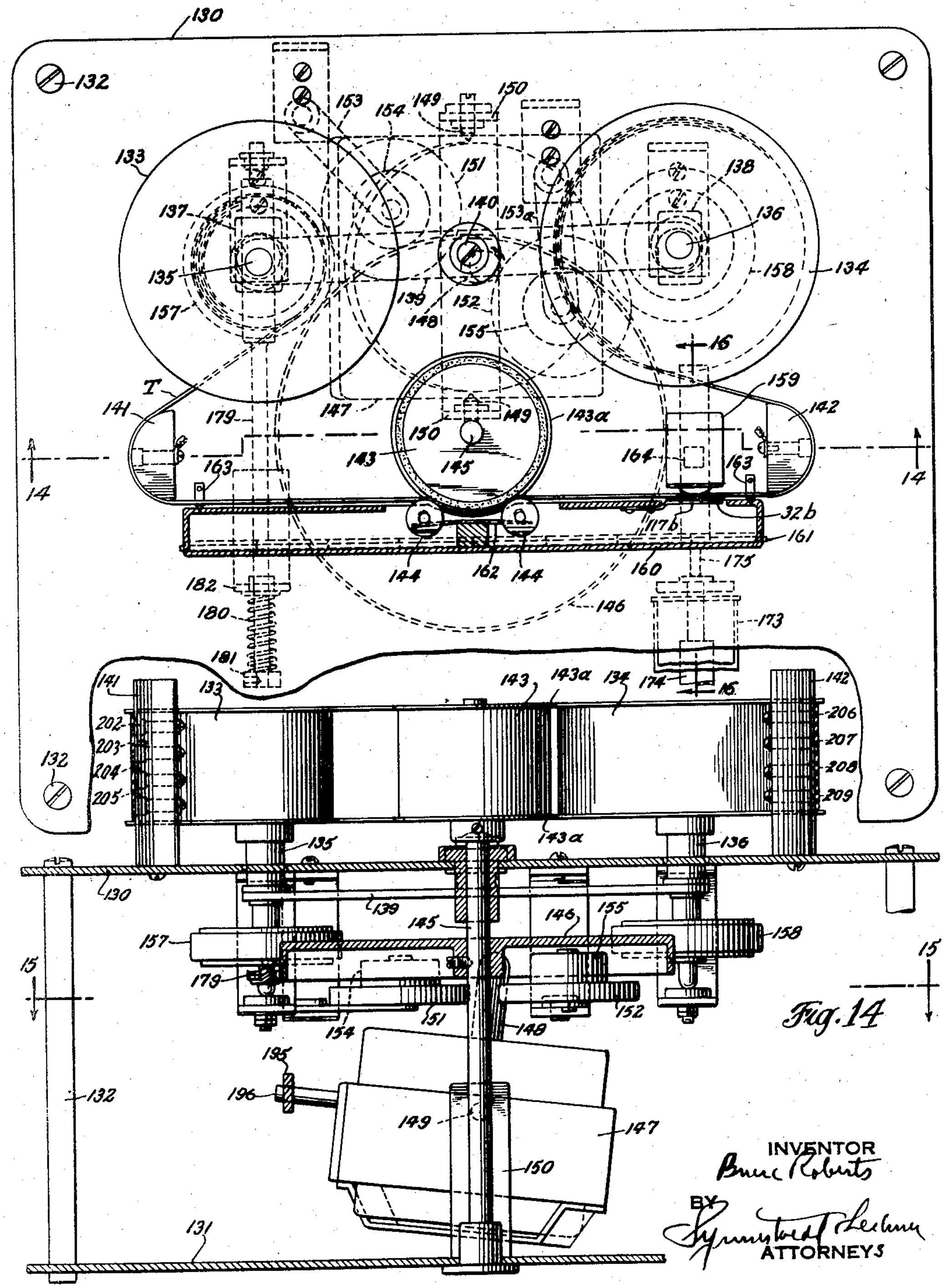
Figure 13 is a plan view with parts shown in horizontal section, of a second form of machine constructed according to the invention.
Figure 14 is a vertical sectional view taken substantially as indicated by the section line 14—14 on Figure 13.

Referring first to Figures 13 and 14, the machine is built up on a pair of plates 130 and 131, which are interspaced and supported by posts 132. The machine is adapted to receive a pair of tape reels 133 and 134, which are advantageously of width adapted to carry a fairly broad tape, for instance a tape equivalent to the width of the standard 35 mm. moving picture film. The reels are arranged to be removably mounted upon reel spindles 135 and 136 which are extended downwardly through the top plate 130, elongated apertures 137 and 138 being provided in the top plate for this purpose. The spindles are carried by a double-ended lever 139 pivoted for oscillation about the vertical pivot 140. The reels are adapted to be driven by drive mechanism described herebelow.

The feed path of a tape T between the reels is defined by a pair of fixed guide posts 141 and 142 and by the tape driving capstan 143 and the cooperating guide rollers 144—144. Upper and lower tape guiding flanges 143*a*—143*a* (the upper one being removed in the illustration of Figure 13) serve to define the path of feed of the tape edgewise thereof. The guide rollers 144—144 are mounted in the manner described herebelow and serve to maintain the tape in frictional engagement with the driving capstan 143 over an appreciable portion of the periphery of the capstan, the capstan having a surfacing with a high coefficient of friction to provide against slippage of the tape thereon. This capstan constitutes the element serving to establish the rate and direction of feed of the tape between the reels 133 and 134.

The capstan is mounted on a shaft 145 which also carries a drive drum 146 against the peripheral flange of which various of the drive elements now to be described are adapted to cooperate.

The driving motor is indicated at 147, this motor being arranged with its shaft 148 extended generally vertically, the motor, however, being carried by a pair of pivots 149—149 supported by standards 150—150 projecting upwardly from the lower or base plate 131. Pivots 149 provide a generally horizontal axis about which the motor as a whole may oscillate for the purpose of reversing the direction of drive.

Oscillation of the motor is adapted to bring the motor shaft 148 alternatively into engagement with one or the other of the drive pucks 151 and 152. The drive puck 151 is carried by a pivoted arm 153 and has a friction surface 154 adapted to engage the external surface of the drive drum 146. Similarly, the puck 152 is carried by a pivoted arm 153$a$ and has a drive surface 155 adapted to engage the internal surface of the drive drum 146.

As best seen in Figure 3, when the motor is oscillated the pucks 151 and 152 serve respectively to drive the drum 146 in opposite directions. A spring 156 may be provided to normally urge the arm 153 in a direction retaining engagement of puck 151 with the drive drum 146. By the foregoing drive mechanism the capstan 143 is alternatively driven in either direction and it may be noted that the direction of rotation of the motor shaft (see the arrow in Figure 15) is such as to provide a "self-energizing" action in either direction of drive, i. e., the relation of the motor shaft and drive pucks to the drive drum 146 is such that in either direction of drive the driving force tends to tighten the frictional engagement of the intermediate driving puck with the drive drum 146. This is of importance in maintaining stability of drive, i. e., constant velocity drive, and thereby eliminating the effect known in the trade as "wow."

The reel spindles 135 and 136 carry frictional drive members 157 and 158, respectively, which upon oscillation of lever 139 are adapted to be brought into engagement with the external surface of the drive drum 146.

During operation of the machine, the tape is adapted to be scanned by the magnetic scanning device or head 159, this head preferably being designed to be capable of use either for recording purposes or for playback. As seen in Figure 13 the head is arranged along the path of the tape between the capstan 143 and the guide post 142 and is located on the same side of the tape as the capstan 143. Interengagement of the tape with the scanning device is maintained by means of a yielding backing pad 32$b$ which is carried by a spring 117$b$, in turn mounted on a support 160 pivoted to the top plate 130 of the machine by means of the horizontal pivot 161 (see particularly Figure 16). This backing member 160 also serves to yieldingly carry, as by spring 162, the pair of rollers 144—144 above referred to which are arranged to maintain engagement of the tape with the driving capstan. The device 160 is so arranged that the action of gravity tends to maintain the interengagement of the backing pad 32$b$ with the tape opposite to the head 159 and also to maintain guide rollers 144—144 in engagement with the tape in the region of the drive capstan 143. The pivot 161 for the device 160, however, also permits this device to be swung away from the head 159 and the capstan 143, whereby to provide a wide opening or channel in which the tape may conveniently be threaded. Spring pressed catches such as shown at 163, having a snap action, may be used to aid in retaining the member 160 in its operating position.

Figures 15, 16, 17:
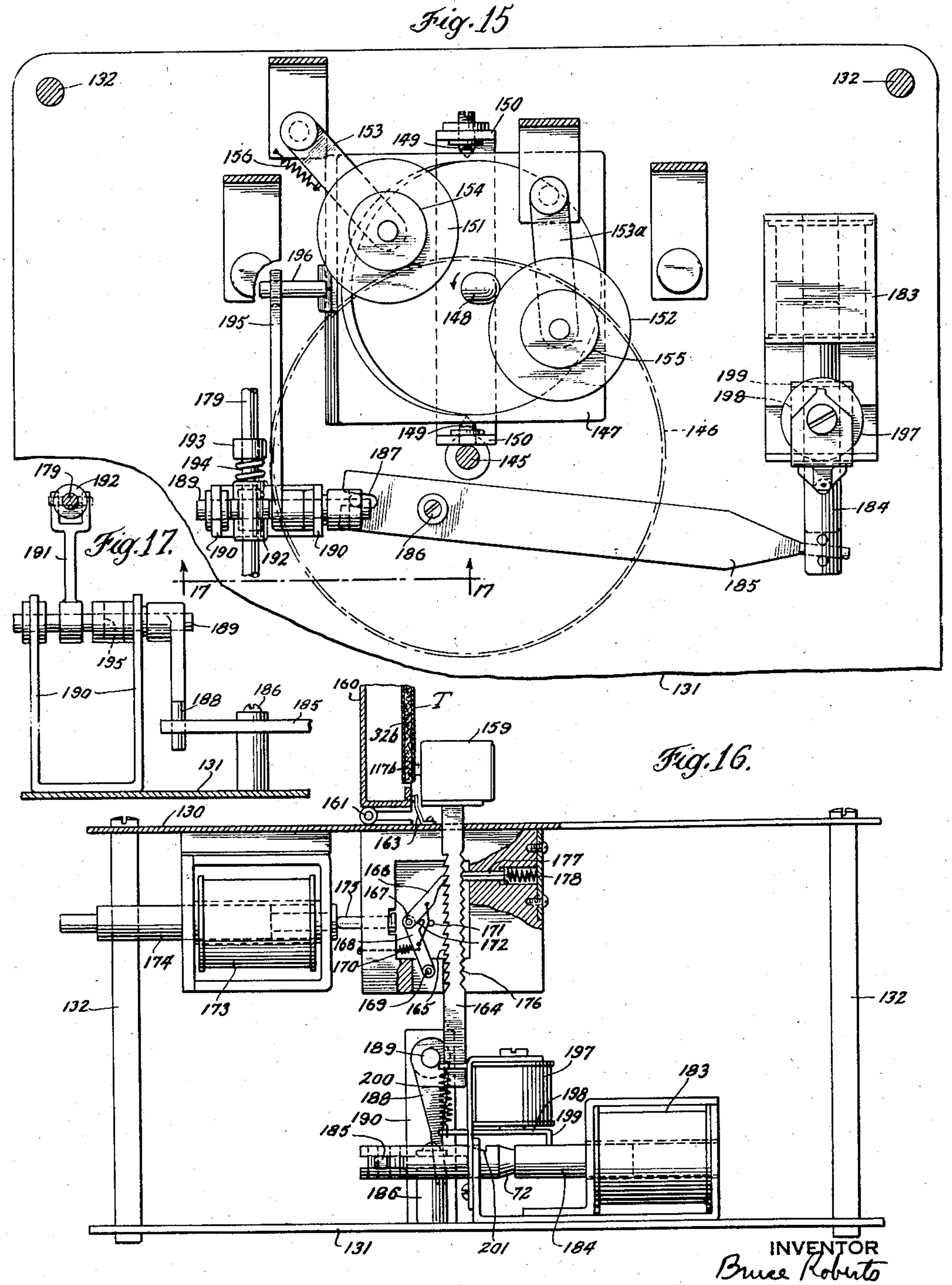
Figure 15 is a plan view of certain parts, especially drive and control parts, the view being taken substantially as indicated by the line 15—15 on Figure 14.
Figure 16 is a vertical sectional view taken as indicated by the section line 16—16 on Figure 13.
Figure 17 is a view of certain details taken as indicated by the line 17—17 on Figure 15.

Attention is now called to the mounting of the recording-reproducing head 159, which mounting is best shown in Figure 16. As there seen, the head is carried by a vertically shiftable post 164 having a rack 165 at one side thereof with which the pawl 166 is arranged to cooperate. Pawl 166 is pivoted at 167 to a level 168 which in turn pivoted to a fixed part at 169. A spring 170 urges lever 168 away from the rack 165 and a spring 171 acts to draw the pawl 166 toward the lever 168 to the limit of motion permitted by the stop 172. This pawl device (including the pawl 166 and lever 168) are adapted to be actuated to raise the post 164 stepwise, the actuating mechanism including a solenoid 173 having an armature 174 adapted to drive the tappet 175 toward the right so as to cause the pawl to engage a tooth on rack 165 and raise the post 164 one notch. Vertical positioning of the post 164 is established by a series of teeth 176 with which a detent 177 is adapted to engage, the detent being urged into engagement with the teeth by a spring 178.

Operation of the above described mechanism for raising the scanning head stepwise is coordinated with the mechanism for reversing the reel drive and the capstan drive, the means providing such coordination being described below with particular reference to Figure 18.

As seen in Figures 13, 15 and 17, the oscillatable lever 139 which carries the reel spindles 135 and 136 is adapted to be shifted by means of the horizontally extending rod 179. A spring 180 associated with this rod and reacting between an abutment 181 at the end of the rod and a fixed part 182 normally urges the lever 139 to that position in which the drive wheel 157 on spindle 135 is in engagement with the drive drum 146 and the drive wheel 158 on spindle 136 is disengaged from the drive drum 146. Shifting of the rod 179 in the opposite direction (against the action of spring 180) is effected by means of a solenoid 183 (see particularly Figures 15 and 16). The armature 184 of this solenoid is connected with one end 185 of a lever pivoted at 186, the other end of this lever being notched as at 187 to engage an arm 188 which is fixed on a shaft 189 mounted by means of a bracket 190. Shaft 189 also carries an arm 191 which is forked at its upper end to embrace shift rod 179 and to engage sleeve 192 which is slidable on the shift rod 179. As seen in Figure 15 the shift rod 179 has a collar 193 secured thereto and a spring 194 is interposed between the collar 193 and the sleeve 192. Actuation of the solenoid 183 causes swinging of lever arm 185 about the pivot 186, and this motion is transmitted through arms 188 and 191 to the sleeve 192 and from there through spring 194 to collar 193 and thus to the shift rod 179, the motion being transmitted in a direction in opposition to the return spring 180 and thereby causing the lever 139 which carries the reel spindles to shift in the opposite direction. This motion disengages the drive wheel 157 from the drive drum 146 and engages drive wheel 158 with the drum, thereby shifting the drive from one reel to the other.

The shaft 189 above referred to also carries an arm 195 which is apertured at its free end to receive a pin 196 secured to and projecting from the motor 147 (see also Figure 14). Motion of this arm 195 thus also tilts the motor shaft 148 to bring it into engagement with intermediate drive puck 151. The engagement of the motor shaft 148 with puck 152 is also yieldingly maintained by the return spring 180, above described, which is associated with the shift rod 179.

It may be here mentioned that certain of the drive elements, especially the drive wheels 157 and 158 for the reel spindles and the operating surfaces of the pucks 151 and 152 are advantageously surfaced with a material having a relatively high coefficient of friction. This aids in providing stability of drive. With regard to the drive it is further pointed out that the reel drives tend to overrun the capstan drive, so as to maintain the tape under some slight tension. The drive of the tape by the capstan, however, is controlling, and slippage occurs in the reel drives between the drive drum 146 and the friction wheels 157 and 158.

A solenoid 197 is provided to retain the armature 184 of solenoid 183 in the right hand position (when viewed as in Figure 16). Solenoid 197 has a armature 198 with a tooth 199 yieldingly urged toward the armature 184 by a spring 200. Armature 184 is notched as at 201 and the tooth 199 of armature 198 is adapted to engage in this notch when the armature 184 is shifted to the right. This serves to retain the armature 184 in the position in which the drive wheel 158 for tape reel 134 is in engagement with the drive drum 146 and in which the motor shaft is in engagement with drive puck 151. The operation and control of the various devices described above is discussed herebelow with particular reference to the diagram of Figure 18. First note, however, that guide posts 141 and 142 are preferably formed of electrical insulating material and that each post carries a series of four contact members 202, 203, 204, 205 and 206, 207, 208, 209.

Figure 18:
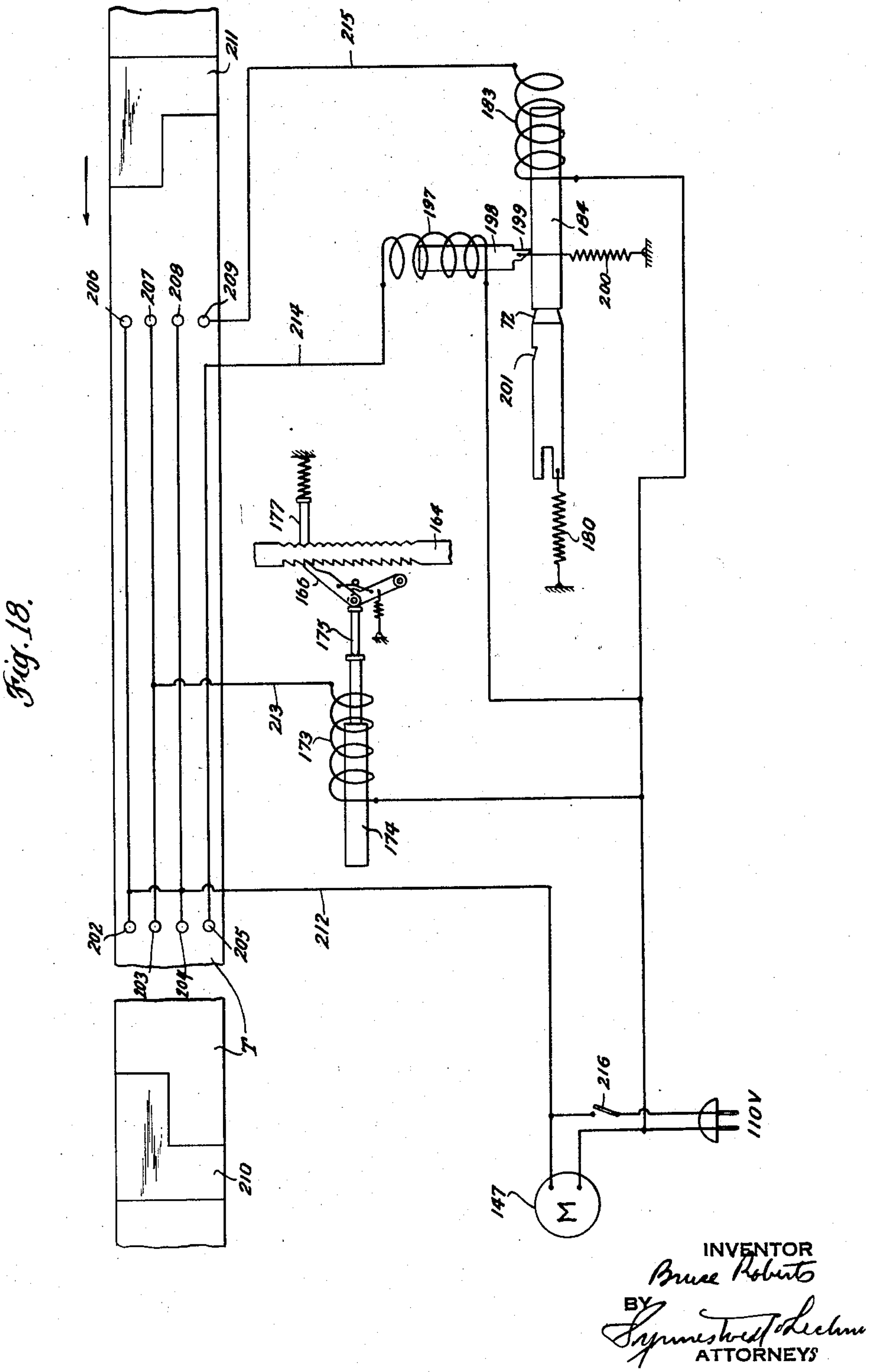
Figure 18 is a schematic view of certain of the control circuits and associated parts of the machine shown in Figures 13 to 17.

As shown in Figure 18, toward each end of the tape T, the tape carries a contact piece, for instance a piece of metal foil adhesively secured to the tape, as indicated at 210 and 211, and adapted to cooperate respectively with the series of contacts 202–205 and 206–209.

Contacts 202 and 204 are interconnected and are also coupled with wire 212 which is associated with one side of the power supply line. Contacts 203 and 205 are interconnected and also coupled with the wire 213 which is extended to one terminal of the head actuating solenoid 173. Contacts 204 and 208 are likewise interconnected and are associated with wire 212 above referred to. Contact 205 is connected by wire 214 with one terminal of solenoid 197; and contact 209 is connected by wire 215 with one terminal of solenoid 183. The other terminals of the three solenoids, 173, 197 and 183, are all connected with the other side of the power supply line, as is plainly shown. The driving motor 147 also receives current from the supply line, and a shutoff switch 216 is provided.

In considering the diagram of Figure 18, it is assumed that the tape has been running in the direction indicated by the arrow and that substantially all of the tape has been wound up upon reel 133 (Figure 13). Moreover, as shown, the tape contact element 211 is approaching the series of contacts 206–209. Upon reaching these contacts, the contact element 211 completes various of the control circuits, as follows:

The circuit through wire 213 and solenoid 173 is completed, thereby actuating the armature 174 and raising the post 164 one notch, thus also lifting the scanning head 159 one track. The circuit including wire 215 and solenoid 183 is completed, thereby moving the armature 184 to the right and causing engagement of tooth 199 in the notch 201. This reverses the drive mechanisms for the tape reels and for the tape driving capstan and initiates transmission of the tape in the reverse direction.

It is here noted that the tape contact element 211 has portions of different dimension axially of the tape. This is provided to ensure adequate time of energization of the solenoid 173 to raise the scanning head to the succeeding track. By variously shaping and proportioning the tape contact elements the time of energization of the solenoids and the sequence of energization thereof may be regulated.

Upon reversal of the direction of translation of the tape as referred to shortly above, the tape is wound up on reel 134 (see Figure 13) and toward the end of this run of the tape, the tape contact element 210 cooperates with the contacts 202 to 205, with the following effects:

The circuit including wire 213 and solenoid 173 is again energized to raise the scanning head to the next track. The circuit including wire 214 and solenoid 197 is energized whereby to lift the armature 198 and thus disengage tooth 199 from the notch 201, whereupon the return spring 180 moves the armature 184 to the left, bringing the drive parts back to the position illustrated in Figures 13 and 15. Another run of the tape now takes place from reel 134 to reel 133.

The successive reversal in direction of scanning continues a multiplicity of times, it being contemplated that in a typical equipment of the character described at least ten side-by-side tracks may be scanned on a tape of a width equivalent to that of the 35 mm. motion picture film. In this way, even with tape reels of relatively small diameter, for instance three inches to three and one-half inches, upwards of an hour's recording may readily be carried on a single tape.

It may be noted that if desired the armature 184 of solenoid 183 may be provided with an intermediate notch *n* which may cooperate with tooth 199 of the armature 198 upon manual shifting of the armature 184. This is provided so that if desired the drive mechanisms may be set in neutral, i. e., a setting in which neither of the reel driving wheels 157 and 158 is in engagement with the drive drum 146 and in which the motor shaft 148 is disengaged from both of the pucks 151 and 152.

The third form of my invention, illustrated in Figures 19 to 22, will now be condisered.

Referring first to Figures 19 to 22 inclusive, a phonograph turntable is indicated at 217, this turntable being mounted above the base plate 218 of the phonograph by means of the shaft 219 which terminates at its upper end in the usual spindle 220 which, in normal phonograph operation engages in the central aperture in the standard disc type record. It will be understood that the turntable 217 is adapted to be driven, either through the shaft 219 or in any other suitable well known manner and that the phonograph would of course be equipped with the standard pickup (not shown) by means of which standard disc recordings may be reproduced.

The machine of the invention is built upon a main supporting plate 221 having standards or feet 222 adapted to straddle the turntable 217 and rest upon the base plate 218 of the phonograph.

A walking beam or lever 223 is pivoted to the plate 221 on the vertical pivot 224 and this lever serves as a support for reel shafts 225 and 226 which are journalled therein and extended both above and below the supporting plate 221 and the lever 223. Elongated or enlarged apertures 227 and 228 are formed in the supporting plate 221 so as to permit freedom for pivotal movement of the lever 223 with the shafts 225 and 226. Shafts 225 and 226 serve to mount the reels 229 and 230 between which a tape record such as indicated at T' is adapted to be fed in either direction.

The tape reels are arranged to be driven by means of discs 231 and 232 which are fixed, respectively, on shafts 225 and 226 and which are adapted to be moved into and out of engagement with a driving member described just below.

For the purpose of effecting drive of discs 231 and 232, this form of the invention contemplates employment of a driving puck, advantageously formed as a unit separate from the remainder of the machine, this puck having a part 233 with a central aperture configured to receive the turntable spindle 220 and having at its lower surface friction material such as indicated at 234 (for example, flocking) adapted to frictionally engage the friction material 235 normally provided on the top surface of a phonograph turntable such as shown at 217. The driving puck further includes a part 236 having a rubber or similar surfacing 237 with which the driving discs 231 and 232 are adapted to engage. A spindle 238 projects upwardly from the driving puck and is adapted to be received in a complementary aperture formed in the supporting plate 221 of the machine. Spindle 238 is coaxial with the turntable spindle 220 and serves to position the supporting plate 221 and the parts carried thereby in the proper relation to the turntable and the driving puck.

From the above it will be seen that oscillation of the lever 223 about the pivot 224 will bring one or the other of the discs 231 and 232 into engagement with the driving surface 237 of the puck, to thereby effect drive of one or the other of the reels 229 and 230. This pivotal movement of the lever 223 is effected by means of a pair of solenoids 239 and 240 having a common armature 241 which is slotted to receive the upturned edge of the angle member 242, such angle member being carried by a tongue 243 projecting from one end of the lever 223. Actuation of solenoid 239 shifts the lever 223 to bring disc 232 into engagement with the driving surface 237 and to disengage disc 231 therefrom. Actuation of solenoid 240 brings disc 231 into engagement with the driving puck and disengages disc 232.

Concurrently with the operation referred to just above, oscillation of lever 223 also brings one or the other of the braking fingers 244 and 245 into operation. In the position of the parts illustrated in Figure 19 brake 244 is applied and brake 245 is released. In the opposite position of oscillation of lever 223 brake 245 is applied and brake 244 is released. These brake fingers are adapted to bear directly against the reels 229 and 230 and the coordination of the operation of the brakes is such that the brake is automatically released from reel 230 when reel 229 is being driven and brake 244 is applied to reel 229 at this time. When the lever shifts to the other position, at which time reel 229 is being driven, brake 244 is released and brake 245 is applied.

Figures 19, 20:
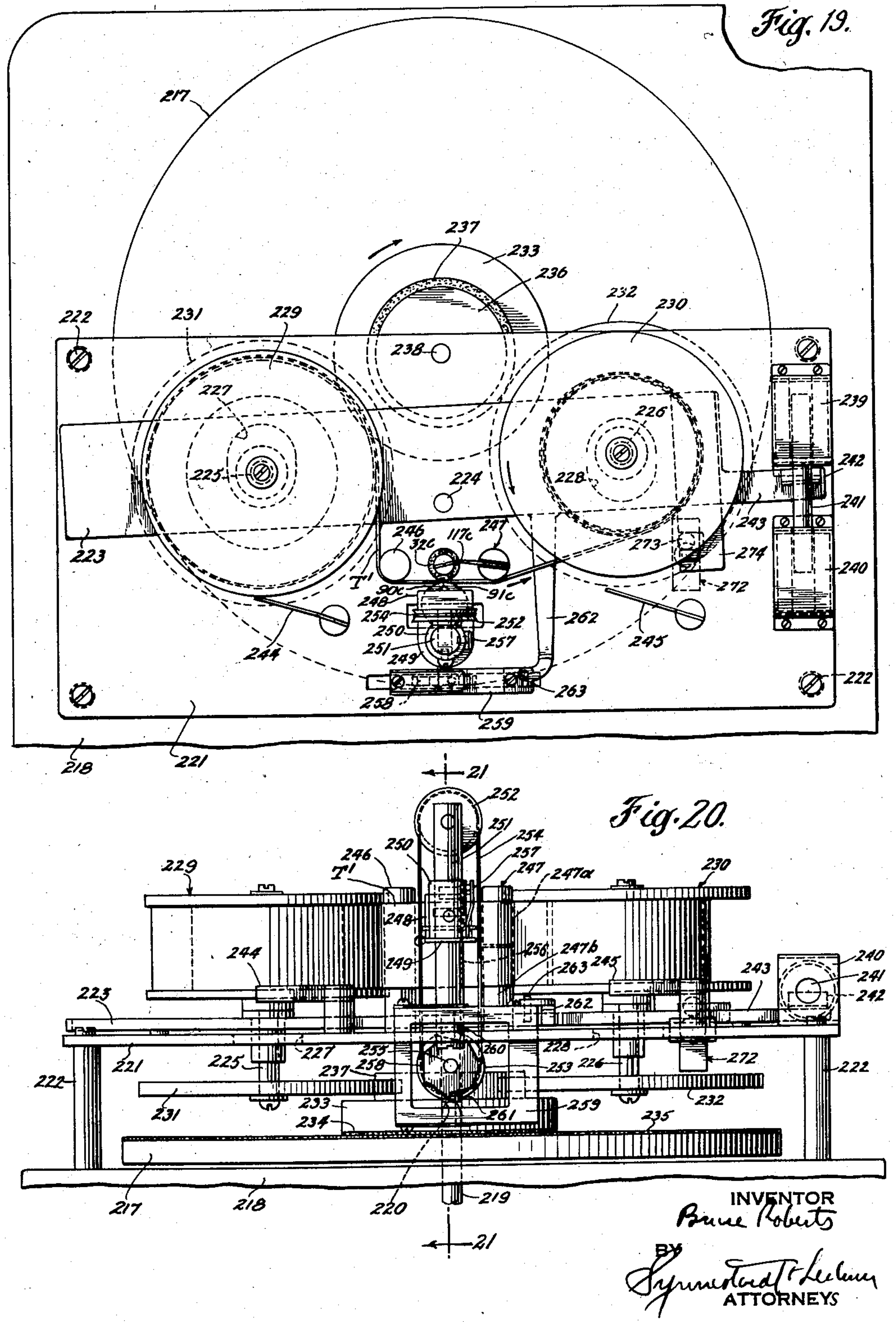
Figure 19 is a top plan view of a third form of machine constructed according to the present invention, the view illustrating the machine as applied to a phonograph turntable of standard type.
Figure 20 is a front elevational view of the machine shown in Figure 19, this view also showing the phonograph turntable with which the machine is associated.
Figure 21:
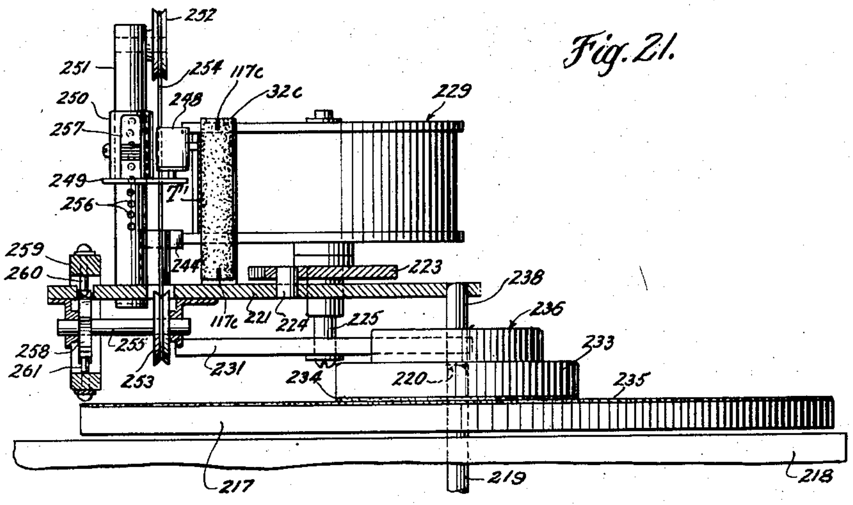
Figure 21 is a transverse vertical sectional view taken substantially as indicated by the section line 21—21 on Figure 20.
Figure 22:
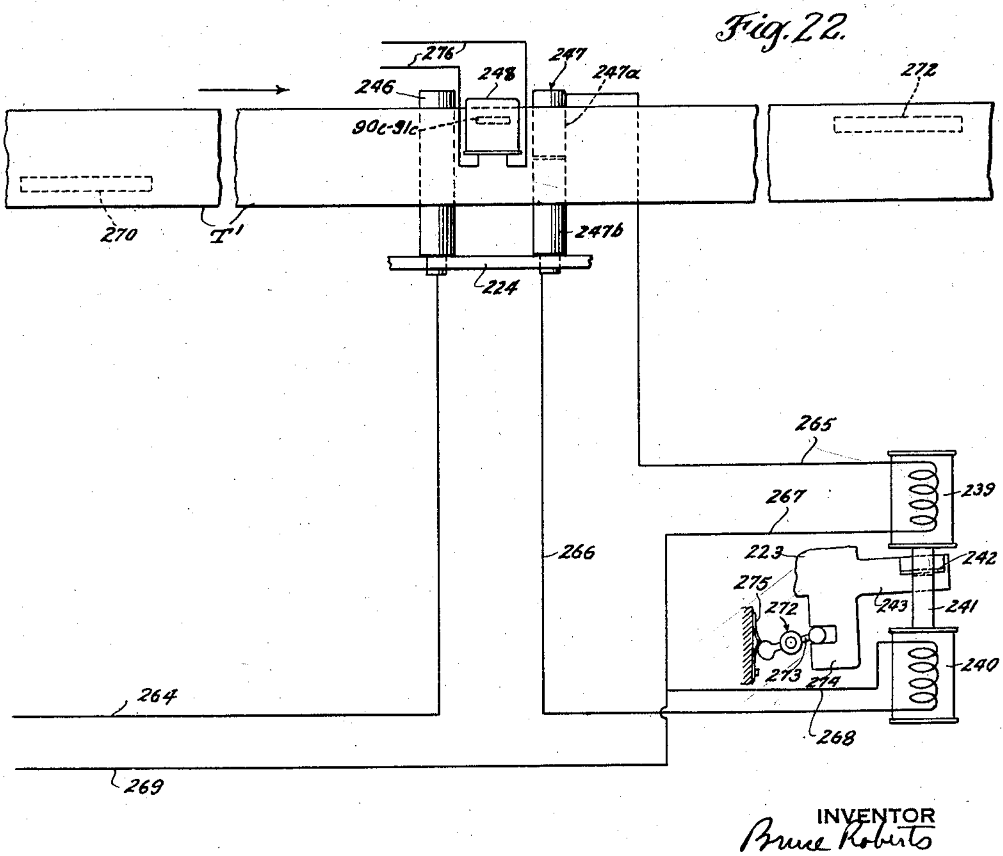
Figure 22 is a diagrammatic view illustrating certain parts of the machine shown in Figures 19 to 21 and also illustrating a control system therefor.

Attention is now called to the fact that the feed path between the reels 229 and 230 is defined by a pair of posts 246 and 247. Intermediate the posts 246 and 247 the tape record is adapted to be scanned by a magnetic scanning device or head 248, having pole pieces 90c and 91c as shown in Figures 19, 21 and 22, this head preferably being constructed to serve for both recording and reproduction.

The tape is retained in contact with the scanning device by means of backing member 32c which is preferably resilient and yieldingly mounted, for instance by spring strips 117c supported by the post 247.

The scanning device 248 is carried on a bracket 249 which is secured to a sleeve 250 vertically slidable on the post 251. A pair of pulleys 252 and 253 carry a belt or cord 254, pulley 252 being journalled at the upper end of post 251 and pulley 253 being fixed on a shaft 255 which is rotatably mounted below the supporting plate 224. One run of the cable 254 is secured to the bracket 249 which carries the scanning device as is clearly seen in Figure 20, and it will be noted that movement of the cable 254 shifts the scanning device vertically with relation to the post 251 and thus with relation to the tape record in the machine. Stepwise movement of the scanning device is contemplated, and, to ensure proper registry of the scanning device with the several tracks on the record to be scanned, the post 251 is provided with a series of vertically spaced notches or sockets 256 with which the spring pressed detent 257 is adapted to cooperate.

The cable 254 is moved to shift the head by means of a starwheel 258 fixed on pulley shaft 255. A rectangular member or yoke 259 is arranged for guided transverse movement in a slot formed in the supporting plate 224 and this yoke carries upper and lower spring pressed actuating elements 260 and 261 (see particularly Figure 21). Because of the saw-tooth shape of the starwheel 258, reciprocation of the yoke 259 in either direction causes one or the other of the elements 260 and 261 to engage a tooth of the wheel and effect rotation thereof and thus shift the vertical position of the scanning device. The rotation of the starwheel will always occur in the same direction, so that the scanning device will be shifted stepwise from the lowermost track on the record to the uppermost track to be scanned thereon. For the purpose of resetting the mechanism, the scanning device may be manually shifted downwardly, the cable 254 at this time, merely slipping upon the pulley 253.

As best seen in Figure 19, the yoke 259 is adapted to be reciprocated by means of an arm 262 which projects from the pivotal lever 223 and which has a pin-and-slot connection 263 with the yoke. Thus oscillation of the lever 223 in either direction will effect reciprocation of the yoke 259 in one direction or the other.

It is contemplated according to the invention that a tape record be fed from one reel (for instance from reel 229) to the other (230), and that toward the end of feed of the tape in this direction the mechanism be automatically tripped to reverse the direction of feed of the tape and concurrently shift the scanning device to the next adjacent track, whereupon the record is scanned in the reverse direction in the second track. This successive reversal and shifting of the scanning device continues until all of the tracks are scanned.

The control system for effecting the functioning described above is best illustrated in the diagram of Figure 22. As there shown, the wire 264 of a power supply line is extended for connection with post 246, which is desirably insulated from the plate 224 and serves as a contact element. Post 247 is preferably of two-part construction, incorporating portions 247a and 247b constituting additional contact elements which are insulated from each other and also from the supporting plate 224. The contact 247a is connected by means of wire 265 with one side of solenoid 239, and contact 247b is connected by wire 266 with one side of the solenoid 240. Wires 267 and 268 connect the other side of each of the solenoids with the other side 269 of the power supply line. With this hook-up, it will be seen that completion of the circuit between post 246 and post part 247b will energize solenoid 240, and that completion of the circuit between post 246 and post part 247a energizes solenoid 239. A contact strip 270 is carried by the tape T′ in position to bridge the gap between post 246 and contact 247b. Contact 270 is preferably located toward one end of the tape, for instance the end which is initially wound upon the reel 229. The other end of the tape carries a similar contact element 272 positioned to bridge the gap between post 246 and the contact 247a. Thus the two contact elements 270 and 271 are offset from each other transversely of the axis of the tape and operate to reverse the direction of feed of the tape at each end thereof.

It may here be noted that the spring strips 117c for supporting the backing member 32c are advantageously mounted in the post 247 by means of insulating bushings or the like, so as to avoid interconnection of post parts 247a and 247b through the core of the backing member 32c.

For the purpose of retaining the lever 223 in one position of adjustment or the other an over-center or toggle device 272 is employed (see Figures 19, 20 and 22), this device including a pivoted lever 273 one end of which is engaged in a slot formed in a plate or bracket 274 which projects from the lever 223. A spring 275 cooperates with the other end of lever 273 to retain the lever 273 and thus the plate 223 in either position of adjustment.

From the foregoing it will be seen that the direction of feed of the tape is automatically reversed by an exceedingly simple mechanism which concurrently provides for application of the appropriate brake (244 or 245) and also for shift of the scanning device, so as to effect scanning of the next adjacent track on the record.

It is contemplated that the circuit 276 of the scanning device may alternatively be coupled either with a source of signal current to be recorded or with an appropriate reproduction circuit, such as an amplifier, so that the same scanning device may be employed alternatively for recording and for reproduction. Tape records may therefore be recorded, for instance by feeding the scanning head with appropriate signal currents derived for example from a radio receiver, a local microphone or the like. The records may be reproduced, for instance by appropriate connection of the circuit 276 of the scanning device with the usual amplifier employed in the phonograph with which the machine is adapted to be associated. Since the electrical circuits referred to form no part of the present invention per se they need not be described in detail herein.

From the foregoing it will be seen that this form of the invention provides an exceedingly simple machine, in the nature of an adapter unit, which may readily be associated with a standard disc record phonograph turntable to receive power therefrom, provision being made for reverse translation or feed of a tape record by driving one or the other of the tape reels.

This application is a continuation in part of my applications, Serial Numbers 715,518; 744,273; and 757,573 filed on December 11, 1946; April 26, 1947; and June 27, 1947; now Patents Nos. 2,625,611; 2,668,059 and 2,694,-110 respectively.

I claim:

1. Apparatus for use with elongated magnetic tape records comprising in combination with a pair of reels between which a tape record is adapted to be fed in either direction, a pair of reel supporting spindles, a tape driving capstan engageable with a tape record in its path of feed between the reels, drive mechanism for rotating the capstan including rotative drive elements one of which rotates in one direction and another of which rotates in the opposite direction, said elements and the reel spindles all being rotatable on spaced parallel axes, a driving belt for interconnecting one spindle and one of said elements and a second driving belt for interconnecting the other spindle and the other of said elements, said spindles and said elements being relatively movable to concurrently and oppositely tighten and loosen the belts.

2. A tape-recording device comprising a pair of tape reels, a tape propelling capstan mounted for rotation with a shaft, a drive disc, a driven disc spaced therefrom and mounted for rotation with said shaft, a mounting plate, a forward motion intermediate disc mounted for rotation on said mounting plate, a reversing intermediate disc mounted for rotation on said mounting plate, said mounting plate being free for movement, a reel driving pulley mounted coaxially with each of said intermediate discs, a pair of reel shafts each carrying a drive pulley, an elastic reel driving belt interconnecting each driving pulley with a driven pulley and exerting moments on said plate whereby said intermediate discs are constrained toward said driven disc, means for moving said mounting plate to bring one of said intermediate discs into engagement with said drive disc and said driven disc, and to carry the other of said intermediate discs out of engagement with said drive disc, and guide means for controlling the moments on said plate whereby said other disc is deflected away from said driven disc.

3. A magnetic tape-translating device comprising a tape reel mounted for rotation with a shaft, a pulley mounted on the reel shaft for rotation therewith, a tape-propelling capstan mounted on a shaft, a driven member mounted on the capstan shaft for rotation therewith, a driving member mounted for rotation on a shaft, an intermediate drive member, a second pulley secured to the intermediate member for rotation therewith, the said member and pulley being mounted for rotation on a shaft capable of displacement with respect to said driven member, and said intermediate drive member being controllably engageable with said driving member for transmitting power from said driving member to said driven member, and elastic belt means for drivably connecting said second pulley with said reel pulley.

4. Equipment for use with magnetic tape records adapted to be fed between a pair of reels, a pair of reel supporting spindles arranged on spaced parallel axes, rotative driving mechanism for the reel spindles, a drive transmission for transmitting power from said mechanism to one reel spindle including a rotative driven member connected with said one spindle, a drive transmission for transmitting power from said mechanism to the other reel spindle including a rotative driven member connected with said other spindle, the spindles and the driven members connected therewith being pivotally movable to engage and disengage said drive transmissions, and a common pivotal support for the reel spindles and the driven members connected therewith, the support being pivotally mounted on an axis parallel to and between the reel axes to provide for alternative engagement of one or the other of the drive transmissions.

5. Equipment for use with magnetic tape records adapted to be fed between a pair of reels, a pair of reel supports, a capstan engageable with the tape in its path of feed between the reels, a reversibly driven wheel fixed to rotate with the capstan, a drive transmission for transmitting power from said wheel to one reel spindle, a drive transmission for transmitting power from said wheel to the other reel spindle, said drive transmissions being alternatively engageable, and control mechanism for alternatively and oppositely engaging and disengaging the reel drive transmissions concurrently with reversal of drive of said wheel.

6. Equipment for use with magnetic tape records comprising, in combination with a pair of reels between which a tape record is adapted to be reversibly translated, a support for said reels having a mounting pivot located between the reels and providing for pivotal movement of the support in either of two directions, each reel having driving means therefor carried by the reel support for pivotal movement therewith, a reel driving element with which said driving means are alternatively engageable upon pivotal movement of said support, and reel braking elements positioned in the path of movement of the reels upon pivotal movement of the said support and providing for application of a braking force to either one of said reels when that reel is not being driven and to release the braking force when that reel is being driven.

7. Equipment for use with magnetic tape records comprising a pair of tape reels between which a tape record is adapted to be reversibly fed, a driving member, a pair of rotative driven members connected respectively with the reels for rotation therewith as a unit and engageable with the driving member, a pair of reel brakes respectively engageable with rotative parts of said units, the driving member and the reel brakes lying respectively at opposite sides of the plane containing the axis of the driven members and the driven members with the reels being mounted for concurrent shifting movement transversely of said plane in either of two directions providing for alternative engagement of the reel drives and also of the reel brakes, the brake for that reel for which the drive is engaged being released, and vice versa.

8. Equipment for use with magnetic tape records comprising a tape reel spindle and a wheel fixed thereto for rotation as a unit with the reel, a driving member, and a stationary member adapted to exert a frictional drag on a part of said rotative unit when in contact therewith, said reel, reel spindle and wheel being mounted for unitary shifting movement into either of two positions in one of which said wheel contacts and is driven by said driving member and in the other of which said stationary member contacts and applies a frictional drag to a part of said unit.

9. In equipment for use with magnetic tape records adapted to be fed between a pair of reels, reel drive mechanism comprising a drive transmission for one reel including a frictionally driven wheel, a drive transmission for the other reel including a frictionally driven wheel, rotative friction driving means for said driven wheels, said driven wheels being disposed for rotation about parallel axes spaced from each other and located toward opposite sides of the driving means, supporting means for said driven wheels providing for conjoint shifting movement thereof in a path generally paralleling the plane containing the axes of the driven wheels for shifting the two driven wheels alternatively into engagement with the driving means, a manually operable control connected with said supporting means and mounted for movement in opposite senses to effect opposite shifting movements of said supporting means, and means for maintaining the control in any one of three positions, in one of which one wheel is engaged with the driving means and the other wheel is disengaged, in a second of which said other wheel is engaged with the driving means and said one wheel is disengaged, and in a third of which, intermediate the first and second positions, both of the driven wheels are disengaged from the driving means.

10. Equipment for use with magnetic tape records adapted to be fed between a pair of reels, a pair of reel supporting spindles arranged on spaced parallel axes, rotative driving mechanism for the reel spindles, a friction drive for transmitting power from said mechanism to one reel spindle to effect rotation thereof in one direction and including a rotative driven member connected with said one spindle, a friction drive transmission for transmitting power from said mechanism to the other reel spindle to effect rotation thereof in the opposite direction and including a rotative driven member connected with said other spindle, the spindles and the driven members connected therewith being movably mounted to provide for establishment and release of the friction drive of said transmissions, and a common support for the reel spindles and the driven members connected therewith, the support being mounted for movement to provide for alternative establishment of one or the other of the drive transmissions.

11. Equipment for use with magnetic tape records adapted to be fed between a pair of reels, a pair of reel supporting spindles arranged on spaced parallel axes, rotative driving mechanism for the reel spindles, a friction drive for transmitting power from said mechanism to one reel spindle to effect rotation thereof in one direction and including a rotative driven member connected with said one spindle, a friction drive transmission for transmitting power from said mechanism to the other reel spindle to effect rotation thereof in the opposite direction and including a rotative driven member connected with said other spindle, and the spindles and the driven members connected therewith being movably mounted to provide for establishment and release of the friction drive of said transmissions.

References Cited in the file of this patent

UNITED STATES PATENTS

| | | |
|---|---|---|
| 2,408,320 | Kuhlik | Sept. 24, 1946 |
| 2,504,587 | Rey | Apr. 18, 1950 |
| 2,535,480 | Begun | Dec. 26, 1950 |
| 2,535,486 | Dank | Dec. 26, 1950 |
| 2,603,721 | Camras | July 15, 1952 |
| 2,625,611 | Roberts | Jan. 13, 1953 |
| 2,668,059 | Roberts | Feb. 21, 1954 |